United States Patent [19]
Andersson et al.

[11] Patent Number: 5,901,746
[45] Date of Patent: May 11, 1999

[54] CONTROLLED FLOW FILLING SYSTEM

[75] Inventors: Bengt S. Andersson, Palatine, Ill.;
Göran T. Larsson, Dalby, Sweden;
Karl-Erik Månsson, Eslöv, Sweden;
Lasse Andersen, Hörby, Sweden

[73] Assignee: Tetra Laval Holdings & Finance,SA, Pully, Switzerland

[21] Appl. No.: 08/943,244

[22] Filed: Oct. 3, 1997

[51] Int. Cl.⁶ .................................................. F16K 1/54
[52] U.S. Cl. .......................................... 137/613; 137/861
[58] Field of Search .............................. 137/613, 614.11, 137/625.3, 625.37, 861, 862; 251/121; 141/105

[56] References Cited

U.S. PATENT DOCUMENTS

| | | | |
|---|---|---|---|
| 4,299,338 | 11/1981 | Jain et al. | |
| 4,590,969 | 5/1986 | Sirois et al. | 137/613 X |
| 4,817,667 | 4/1989 | Hagar | 137/613 |
| 5,156,188 | 10/1992 | Wakita et al. | 251/121 X |
| 5,516,079 | 5/1996 | Baumann | 137/625.3 X |

*Primary Examiner*—Kevin Lee

[57] ABSTRACT

A controlled flow filling system is used with a flowable product filling apparatus. The filling system includes a first, upstream V-track valve in series with a second, downstream umbrella valve to provide a substantially paraboloid liquid flow profile of the fluid while filling an associated container. The filling system is configured such that a substantial portion of the pressure drop associated with the flowing fluid occurs at the V-track valve cone to reduce spraying and loss of the fluid product at the umbrella valve. The filling system is used in a filling apparatus that uses pumps or a pressured gas blanket to provide motive force to drive the fluid through the apparatus.

11 Claims, 4 Drawing Sheets

CONTROLLED FLOW FILLING SYSTEM

FIELD OF THE INVENTION

This invention pertains to a controlled flow filling system. More particularly, this invention pertains to a controlled flow filling system having two valves in series for introducing flowable product into a container in a filling apparatus.

BACKGROUND OF THE INVENTION

Various types of filling apparatus are known in the art. In one common use, such an apparatus is used to fill containers with a flowable product, such as milk, juice and the like. As will be recognized by those skilled in the art, such a flowable product can be liquid, dried, granulated or powered products, as well as a combination of such solid (e.g., dried, granulated or powdered) and liquid materials.

Those skilled in the art will recognize that filling must be done in a controlled, metered manner in order to assure that the proper quantity in weight or volume is added to each container. Moreover, in order to prevent spilling or splashing of the flowable product, a controlled, and controllable, end of the filling cycle is desirable. It has been observed that when the end of the filling cycle is controlled, the final amount of product in the container is more readily controlled and filling the container with the desired amount can be achieved.

A typical filling apparatus includes a tank or reservoir for storage of the flowable product, such as storage of milk. One or more filling trains receive milk from the storage tank and pump the milk into respective containers through a filling valve and nozzle arrangement.

Various types of valves are known in the art. One type of valve that is commonly used at the apparatus discharge to the container is referred to as an "umbrella valve". The umbrella valve includes a body having a generally round fluid passage therethrough contiguous with an expanding, conical-shaped valve opening. A valve plug has a conical-shaped plug body that is complementary to the valve opening. A valve stem extends from the top of the conical plug, through the fluid passage. The valve plug is actuated by, for example, a mechanical actuator or a pneumatic cylinder operably connected to the stem to move the plug between the opened and closed positions.

The umbrella valve is so-called because of the flow profile of the fluid exiting the valve. That is, when fluid flows through a passage formed between the conical-shaped plug and body, it exits the valve and flows in a paraboloid shape, much like water flowing off of an umbrella.

One drawback to the umbrella valve arrangement that has been observed is that there is often spraying of the liquid from the passage between the body and plug. This is due to a large pressure drop at the umbrella valve plug edge with resulting fluid spray. It will, of course, be recognized that such a spray is undesirable, in that it can fall onto the outside of the container and the surfaces of the filling apparatus. In addition, such spraying can cause foaming of the product as it is filling the container, which is also an undesired effect.

Accordingly, there continues to be a need for an umbrella valve arrangement, in which the flow of material through the valve is controlled, resulting in a more controlled and predictable umbrella-like flow profile, and a controllable end of filling flow profile.

SUMMARY OF THE INVENTION

A controlled flow filling system is used in a flowable product filling apparatus. The apparatus includes a storage tank, a filling tube having a discharge end and a filling conduit extending between the storage tank and the filling tube. The controlled flow filling system includes a first valve positioned intermediate the storage tank and the filling tube discharge end. The first valve has a regulator cone having a plurality of generally V-shaped grooves therein. A second valve is positioned adjacent to the filling tube discharge end, intermediate the first valve and the filling tube discharge end. The second valve has a valve body having a fluid passage contiguous with a conical-shaped valve opening and a valve plug having a conical-shaped complementary to the valve opening. The second valve defines a gap between the valve body and the valve plug when in an opened state. Fluid flowing through the system is subject to a pressure drop at the first valve and when the fluid flows through the gap in the second valve it is subject to a pressure drop that is less than the pressure drop across the first valve. The fluid flowing out of the second valve defines an umbrella-like-shaped flow profile.

In a preferred embodiment the second valve is positioned in the filling tube. In a most preferred embodiment the first valve is also positioned in the filling tube adjacent to and above the first valve. That is, the first and second valves are adjacent to one another, positioned in series, immediately above the filling tube discharge.

Other features and advantages of the present invention will be apparent from the following detailed description, the accompanying drawings, and the appended claims.

DETAILED DESCRIPTION OF THE PREFERRED EMBODIMENTS

Figure 1:
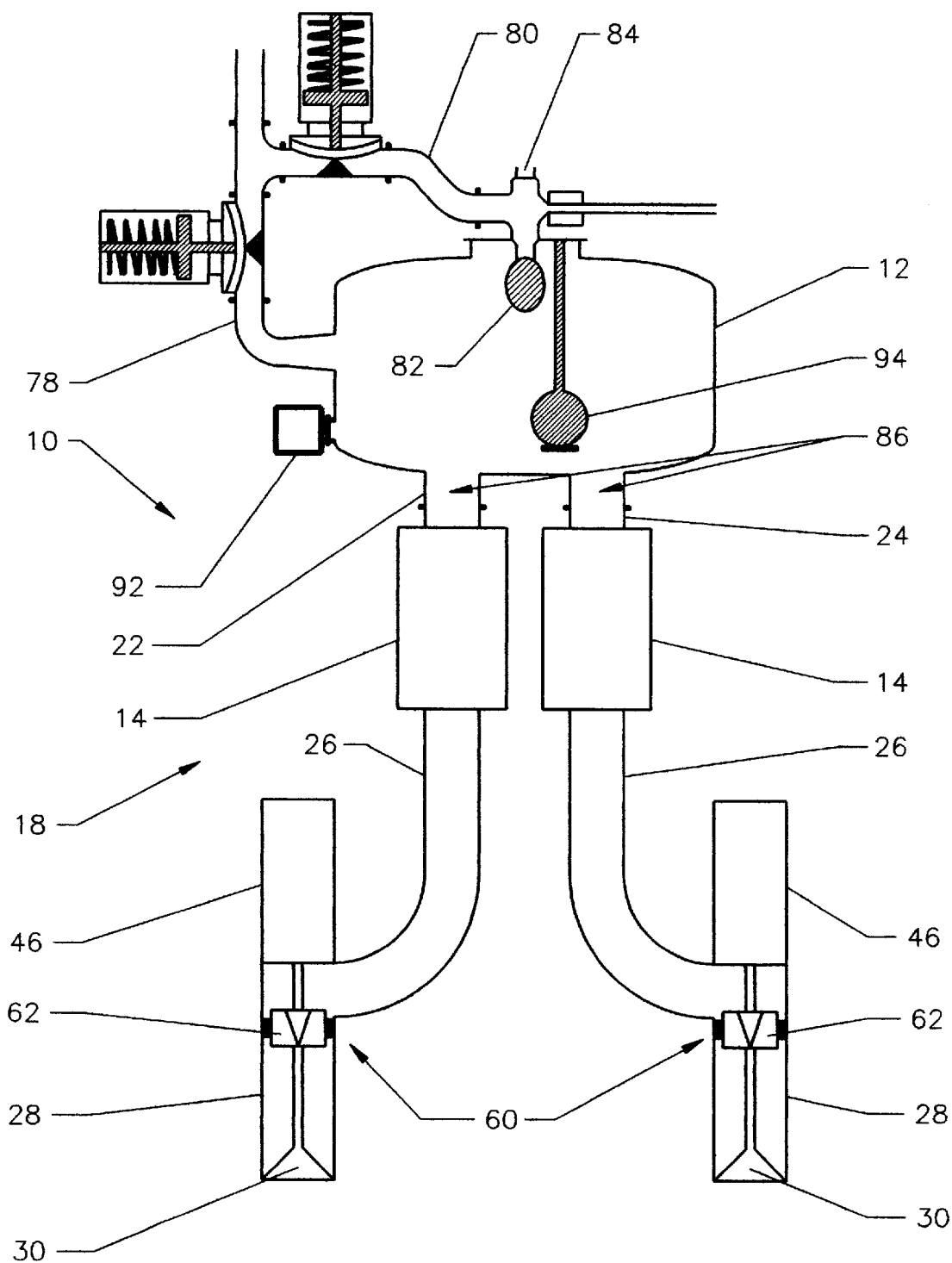
FIG. 1 is an illustration of an exemplary filling apparatus having an embodiment of flow controlled filling system, embodying the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the figures, and in particular to FIG. 1, there is shown a flowable product filling apparatus 10. The exemplary apparatus 10 includes a storage tank or reservoir 12 for storage of the flowable product. For purposes of the present discussion, the flowable product will be referred to as a fluid. However, it is to be understood that the apparatus 10 can be configured for use with various products, including but not limited to liquid food product, solid (e.g., particulate, granulated and powdered) product, and a combination of liquid and solid product.

Figure 2:
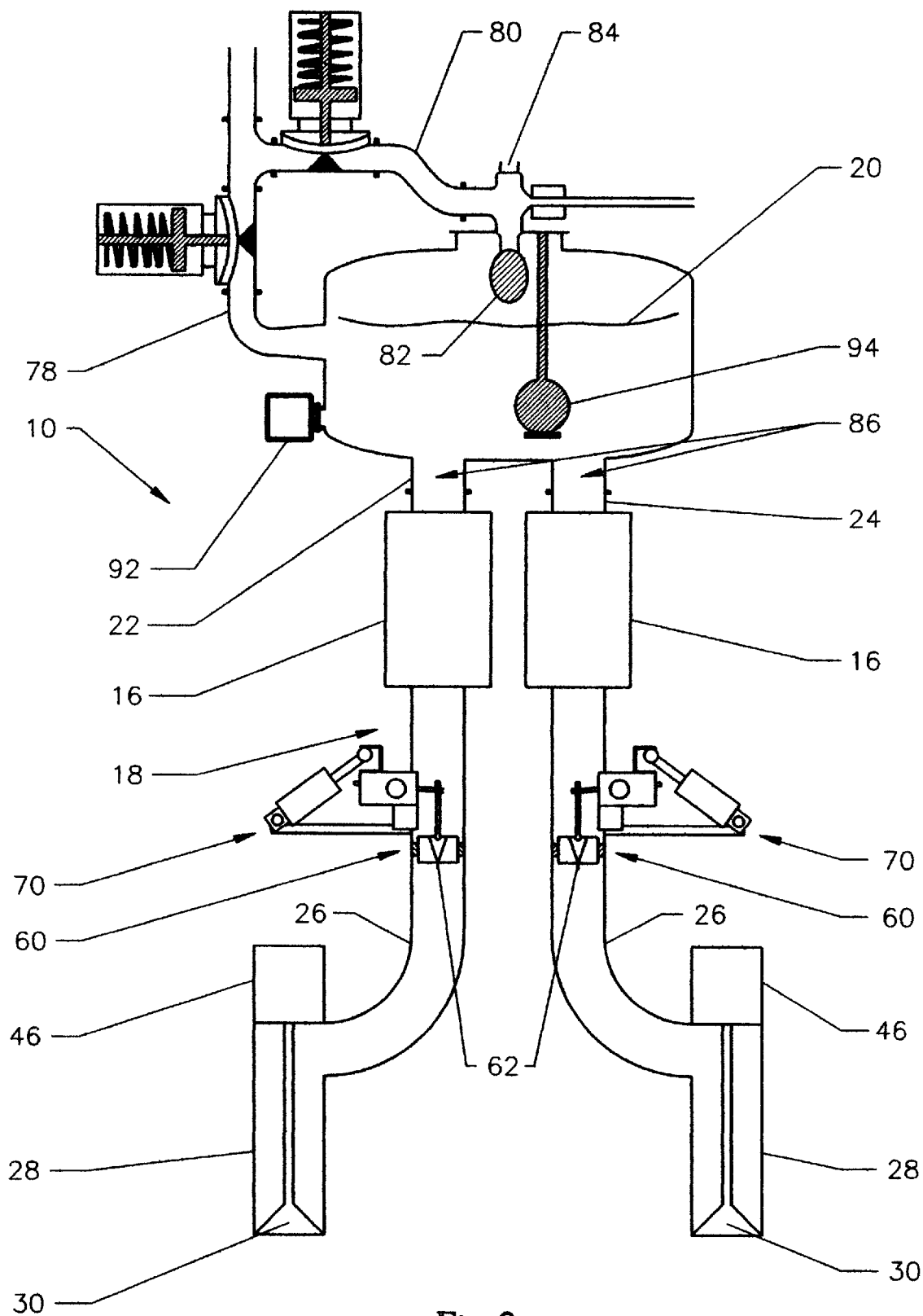
FIG. 2 is an illustration of another exemplary filling system having an alternative embodiment of the flow controlled filling system.

The storage tank or reservoir 12 provides a supply of product to a pump 14 or flow measuring device 16, which will be discussed in more detail herein. Briefly, the present controlled flow system 18 can be used with a driven filling arrangement such as one that includes pumps 14 to provide motive force to the fluid (as shown in FIG. 1), or the system 18 can be used with a pressure driven system in which positive pressure by, for example, a sterile air blanket 20 is used to provide motive force to move the fluid (as shown in FIG. 2). For purposes of the present discussion, unless otherwise specified, the pump 14 and flow-measuring 16 arrangements are considered interchangeable.

The fluid supply is provided to the pump 14 or measuring device 16 through a first fluid flow conduit 22. As will be readily appreciated from the drawings, one or more fluid filling trains 24 can be supplied from the tank 12. The fluid flows through transfer conduit 22 from the tank 12 to the pump 14 or the measuring device 16. A second fluid transfer conduit 26 extends from the pump 14 or the measuring device 16 to a filling tube 28 and provides flow communication to transfer fluid into the filling tube 28. The filling tube 28 discharges into the individual, respective containers (not shown).

Figure 3:
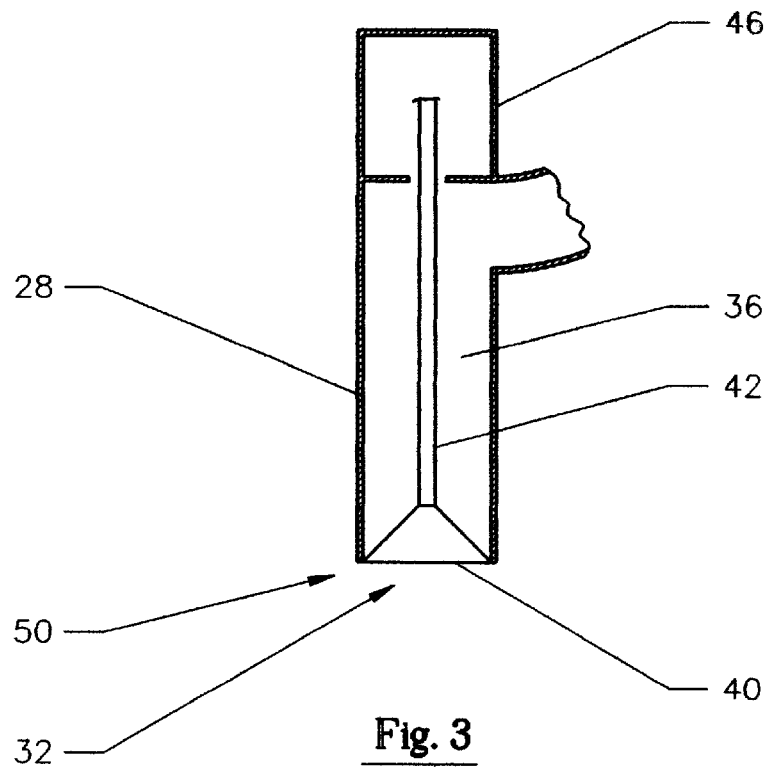
FIG. 3 is a simplified illustration of an umbrella valve shown in the closed position.
Figure 4:
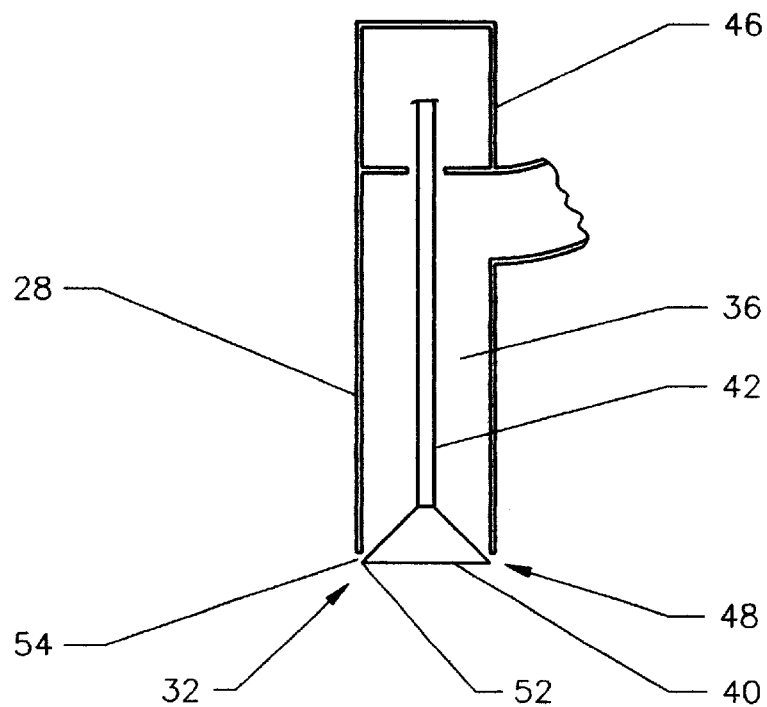
FIG. 4 is a view similar to FIG. 3; showing the umbrella valve in the opened position.
Figure 5:
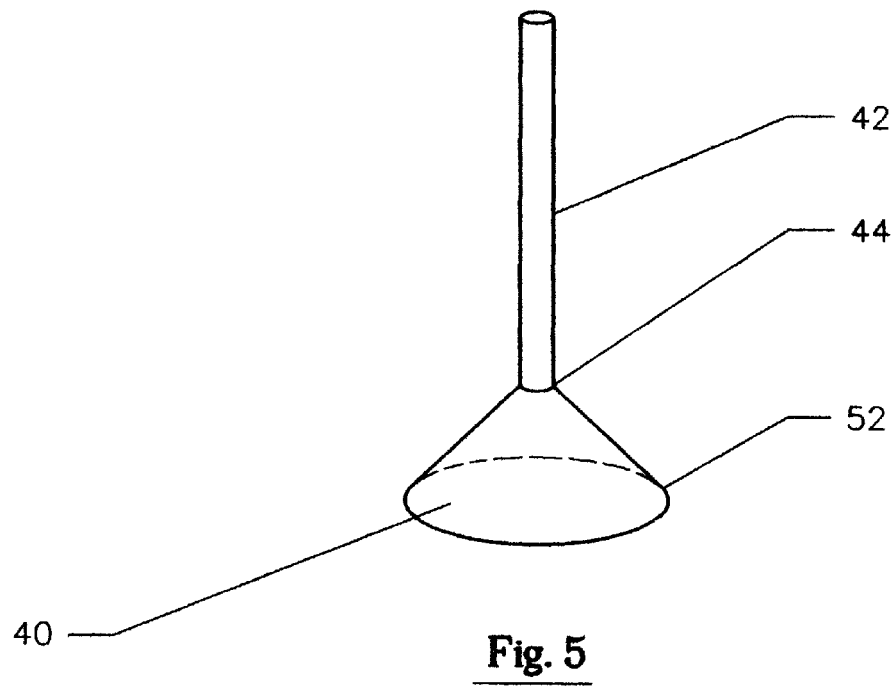
FIG. 5 is a perspective view of an embodiment of an umbrella valve plug.

An umbrella valve 30 is positioned in the filling tube 28 at about a discharge end 32 of the tube 28, to initiate and terminate flow therefrom into the container. The umbrella valve 30, which is illustrated in FIGS. 3–5, includes a body portion 32 and a plug portion 34. The body portion 32 has a fluid passage 36 extending therethrough. Preferably the fluid passage 36 has a circular cross section. The fluid passage 36 opens into a conical-shaped valve opening 38. The valve plug 34 includes a conical-shaped plug portion 40 that is complementary to the conical-shaped body opening 38. A valve stem 42 extends from about the top 44 of the plug 34 upward, through the fluid passage 36. The stem 42 is operably connected to an actuator 46 to move the valve plug 40 between the opened valve position as indicated at 48 (FIG. 4) and the closed valve position as indicated at 50 (FIG. 3).

In known uses of the umbrella valve 30 arrangement, as fluid passes through the filling tube 28, a relatively large pressure drop is seen at the end of the gap 54 between the valve plug 34 and the body 32, at about the edge 52 of the plug 40. As such, the fluid is ejected or sprayed at a substantial rate and with substantial force from the edge of the plug 40. This, as discussed above, can result in spraying of the fluid about the container and the filling apparatus 10.

In order to prevent spraying, the apparatus 10 may include a rubber nozzle (not shown) at the end of the filling tube 28, at about the valve plug 40, to prevent liquid from spraying outside of the container. Although the nozzle arrangement functions well, it can increase the maintenance required for the apparatus 10, and can result in considerable product waste, because the apparatus 10 using rubber nozzles typically requires purging following nozzle replacements.

The present invention uses a V-track valve 60 positioned between the storage tank 12 and the filling tube 28 discharge, and preferably between the pump 14 or flow measuring device 16 and the filling tube 28 discharged. The V-track valve 60 can be positioned in the fluid transfer conduit 26 in a portion extending between the pump 14 or measuring device 16 and the filling tube 28. In a most preferred arrangement, as illustrated in FIG. 1, the valve 60 can be positioned in the filling tube 28, above the umbrella valve 30.

Figure 6:
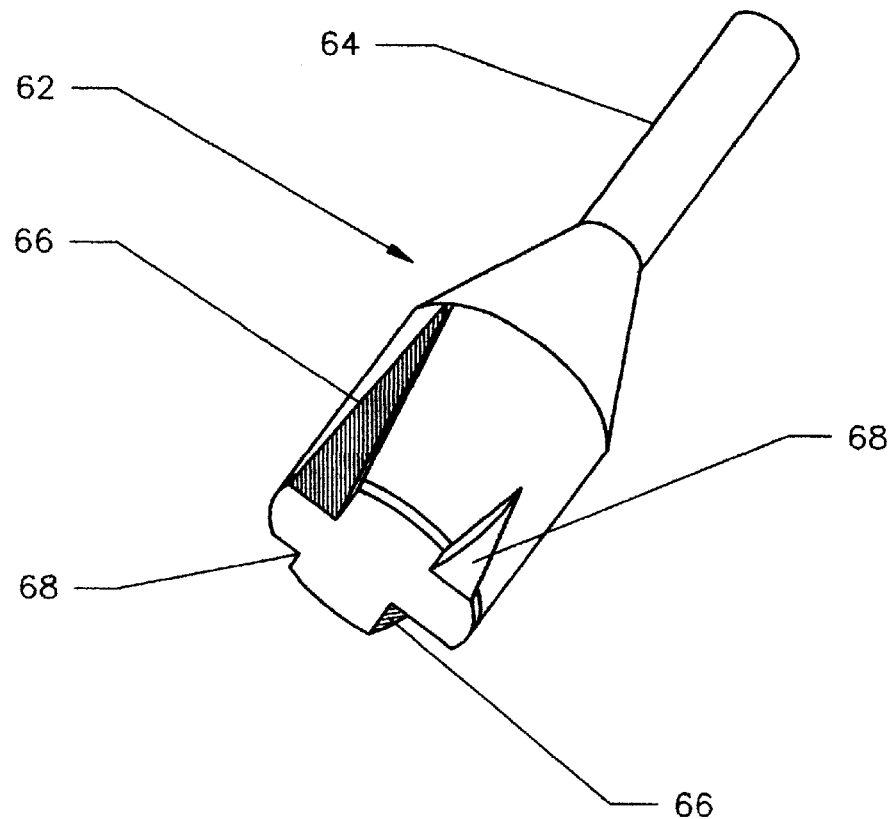
FIG. 6 is a perspective view of an embodiment of a V-track valve cone.

An exemplary V-track valve cone 62 is illustrated in FIG. 6, and is disclosed in U.S. Pat. No. 5,163,476 to Wessman which patent is commonly owned with the present application and which patent is incorporated herein by reference. The V-track valve cone 62 includes a substantially cylindrical body 64 having an even number of V-shaped grooves 66, 68 therein. The grooves 66, 68 extend along the length of the body 64. One-half of the grooves 66, 68 are primary grooves 66 that extend along the entire active length of the cone 62. The remaining half of the grooves are secondary grooves 68 that extend along a portion of the active length of the cone 62. The V-track valve cone 62 can be configured to achieve a situation in which a flow area characteristic during the first part of the valve stroke length consists of a substantially square relationship and, during the second part of the valve stroke length, consists of a combination of two substantially square relationships. This flow profile provides an essentially exponential surface area characteristic.

The V-track valve cone 62 creates a pressure drop by converting pressure into velocity which in turn is converted into heat by vortex formation. It is believed that this occurs because the fluid flows in toward that end of the groove 66 where the groove of the cone has its largest cross-sectional area and flows out where the area of the groove 66 is the smallest. The V-track valve 60 permits finely adjusting the surface area characteristics so as to achieve a desired exponential flow characteristic. One benefit of the V-track valve cone 62 is that it can be used for liquid foods that include solid particles, such as fruit juices that contain fruit flesh pieces. Because of the expanding characteristics of the grooves 66, 68, there are no narrow gaps that are formed between the regulator cone 62 and the valve 60 seat.

Use of the V-track valve 60 in conjunction with the umbrella valve 30 in the present system 18 provides a number of advantages over known filling systems. First, with the V-track valve 60 positioned upstream of the umbrella valve 30, a substantial portion of the pressure drop is taken at the V-track valve 60, rather than at the umbrella valve 30. This results in less kinetic energy imparted to the fluid at the umbrella plug edge 52. It will be recognized by those skilled in the art that a reduction in the pressure drop at the umbrella plug edge 52 will significantly reduce, if not eliminate, fluid spraying that is associated with the large pressure drop at the valve plug edge 52. Advantageously, with the pressure drop taken at the V-track valve 60, rather than at the umbrella valve 30, a number of benefits are seen.

Second, in addition to the reduced or eliminate spraying at the umbrella valve 30 discharge, the V-track valve 60 enhances the ability to control flow through the system 18. That is, because the V-track valve 60 has enhanced flow control characteristics, the liquid flow profile through the apparatus 10 is more readily controlled to provide a desired flow profile at the filling tube 28 discharge. Moreover, it is anticipated that use of the V-track valve 60 in conjunction with the umbrella valve 30, will eliminate the need for nozzles at the end of the filling tube 28. Thus, the present invention can reduce the general maintenance required to the apparatus 10 and system 18.

In one contemplated embodiment, the umbrella valve 30 is provided with a two-position actuator 46, to position the valve 30 in the opened position and the closed position. The V-track valve 60 can alternately be provided with a threeposition actuator 70 that provides for a fully opened position, a closed position and an intermediate position. It is anticipated that the intermediate position will accommodate lower flows such as that that may be desired at about the end of the filling cycle.

Referring now to FIG. 1, an exemplary controlled flow filling system 18 will be described, in which system 18 the V-track valve 60 is positioned within the apparatus filling tube 28. The discussion regarding the apparatus 10 shown in FIG. 1 will be directed to an apparatus 10 which uses pumps 14 to provide motive force for driving the fluid through the valves 30, 60 and into the individual containers. The apparatus 10 includes a storage tank 12 having a product supply line 78 and a cleaning solution line 80 providing input to the tank 12.

A cleaning ball 82 extends into the tank 12 in flow communication with the cleaning solution line 80. A compressed gas, such as compressed, sterile air, line 84 is in flow communication with the cleaning solution line 80 upstream of the cleaning ball 82. The tank 12 includes at least one and preferably a plurality of outlets 86 in flow communication with the fluid conduits 22 that extend from each outlet 86 to the inlet of the respective pumps 14. One skilled in the art will recognize that the particular pumps 14 selected for a given application will depend upon the type of fluid that is being handled, the container volume, and other like considerations.

Each pump 14 outlet is in flow communication with a second fluid conduit that includes, at the end thereof, the filling tube 28. Essentially, the filling tube 28 serves as the discharge end of the second conduit 26. The umbrella valve 30, as described above, is positioned at about the discharge end of the filling tube 28. The umbrella valve 30 moves between the closed position as illustrated in FIG. 3 and the opened position as illustrated in FIG. 4. When in the opened position, the valve 30 defines the gap 54 between the valve plug 34 and the valve body 32, through which fluid flows to the container. The filling tube 28 further includes the V-track valve 60 positioned upstream, that is above, the umbrella valve 30.

As described above, the V-track valve 60 can be a two or a three position valve. The V-track valve 60 is configured to absorb a substantial pressure drop so that the pressure drop across the umbrella valve 30 is lessened. The V-track valve 60 includes an actuator 70 such as the exemplary servomotor. Those skilled in the art will recognize that a variety of different types of actuators 70 can be used for the V-track valve 60, such as worm-screw drives, direct acting stepper motors and the like. Alternately, actuated drives, such as hydraulic and pneumatic cylinders can be used. Likewise, the umbrella valve 30 is operably connected to its actuator 46. Like the V-track valve actuator 70, the umbrella valve actuator 46 can be any one of a number of different types of actuators such as worm-screw drives, direct acting stepper motors, and hydraulic and pneumatic cylinders.

In use, the pump 14 takes suction from the storage tank 12, and pumps the fluid downward through the second conduit 26. The fluid then passes through the V-track valve 60 in which the pressure is significantly reduced. It is contemplated that at the beginning of the pumping and filling cycle, the V-track valve 60 will be in a full open or near full open position. As the container is filled, upon reaching for example seventy-five percent filled, the V-track valve 60 will begin to close (e.g. move to an intermediate position) and will go to full closed at complete or near-complete fill. As the container is filled, fluid flows into the umbrella valve 30, through the fluid passage 36 and through the gap 54 between the plug 34 and valve body 32.

Because a substantial portion of the pressure drop is seen at the V-track valve 60, the fluid passing through the gap 54 exits from the umbrella valve 30 in a substantially paraboloid shape, without spraying on the nearby apparatus 10 surfaces and the container. That is, the fluid exits from the umbrella valve 30 and forms a flow profile much like water falling from an umbrella. Advantageously, the reduced pressure, in conjunction with this flow profile reduces foaming of the fluid as it fills the container.

FIG. 2 illustrates an apparatus 10 in which the motive force for driving the fluid through the apparatus is provided by a pressurized air blanket 20 over the fluid in the storage tank 12. Rather than using pumps to drive the fluid, a flow measuring device 16 is positioned in the apparatus 10 intermediate the storage tank 12 and the filling tubes 28, at about the first and second fluid conduits 22, 24. The flow measuring device 16 can be used to provide a signal to the V-track valve actuators 70 to open and close the V-track valve 60. As shown in FIG. 2, in this configuration, the V-track valve 60 can be positioned in the second conduit 26, upstream of the filling tubes 28. It will, however, be recognized by those skilled in the art that this upstream V-track valve 60 arrangement can be used in systems in which the motive force is provided either by pumps 14 or by the pressurized air blanket 20. Likewise, the configuration illustrated in FIG. 1 in which the V-track valve 60 is positioned in the filling tube 28 can be used with pumps 14 or a pressurized air blanket 20 to provide motive force to the fluid.

Referring again to FIG. 2, the V-track valve 60 is shown with a pneumatic-type actuator 70 operably connected to a mechanical operating assembly 90 for moving the valve 60 between the opened and closed positions. Similar to the arrangement of FIG. 1, a substantial portion of the pressure drop is taken at the V-track valve 60 so that the fluid flowing to the umbrella valve 30 will exit therefrom at a substantially reduced pressure to reduce or eliminate any spraying that may occur.

The apparatus 10 can include a pressure transducer 92 and a level probe 94 to maintain adequate pressure and fluid level in the tank 12. Although the particular control systems for such an apparatus are not within the scope of the present invention, it will be recognized by those skilled in the art that the pressure transducer 92 and level probe 94 can be operably connected to a control system in conjunction with the valve actuators 46, 72 to provide a sequenced, timed filling operation in which a relatively large number of containers can be filled in a given period of time.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A controlled flow filling system for a flowable product filling apparatus, the filling apparatus having a storage tank, a filling tube having a discharge end and a filling conduit extending at least in part between the storage tank and the filling tube, the controlled flow filling system comprising:

a first valve positioned intermediate the storage tank and the filling tube discharge end, the first valve having a regulator cone having a plurality of generally V-shaped grooves therein; and a second valve positioned adjacent to the filling tube discharge end, intermediate the first valve and the filling tube discharge end, the second valve having a valve body having a fluid passage contiguous with a conical-shaped valve opening and a valve plug having a conical shape complementary to the valve opening, the second valve defining a gap between the valve body and the valve plug when in an opened state, wherein a fluid flowing through the system is subjected to a first pressure drop at the first valve and wherein the fluid flows through the gap in the second valve and out of the second valve and is subjected to a second pressure drop at the discharge that is lower than the first pressure drop.

2. The controlled flow filling system in accordance with claim 1 wherein the second valve is positioned in the filling tube.

3. The controlled flow filling system in accordance with claim 1 wherein the first valve is positioned in the filling tube.

4. The controlled flow filling system in accordance with claim 1 wherein the second valve includes a valve stem extending from the plug through the valve body.

5. The controlled flow filling system in accordance with claim 1 wherein the first and second valves are adjacent one another.

6. The controlled flow filling system in accordance with claim 1 wherein the first valve includes an actuator operably connected thereto.

7. The controlled flow filling system in accordance with claim 1 wherein the second valve includes an actuator operably connected thereto.

8. A controlled flow filling system for a flowable product filling apparatus, the filling apparatus having a filling conduit, an inlet and a discharge, the controlled flow filling system comprising:

means for supplying a fluid to the inlet;

a first valve positioned intermediate the inlet and the discharge, the first valve having a regulator cone having a plurality of generally V-shaped grooves therein; and a second valve positioned in the conduit adjacent to the discharge, intermediate the first valve and the discharge, the second valve having a valve body having a fluid passage contiguous with a conical-shaped valve opening and a valve plug having a conical shape complementary to the valve opening, the second valve defining a gap between the valve body and the valve plug when in an opened state, wherein a fluid flowing through the system is subjected to a first pressure drop at the first valve and wherein the fluid flows through the gap in the second valve and out of the second valve and is subjected to a second pressure drop at the discharge that is lower than the first pressure drop.

9. The controlled flow filling system in accordance with claim 8 wherein the filling conduit includes a filling tube having a discharge end.

10. The controlled flow filling system in accordance with claim 9 wherein the second valve is positioned in the filling tube adjacent the discharge end, intermediate the discharge end and the first valve.

11. The controlled flow filling system in accordance with claim 10 wherein the second valve is positioned in the filling tube adjacent the first valve.

* * * * *